UNITED STATES PATENT OFFICE.

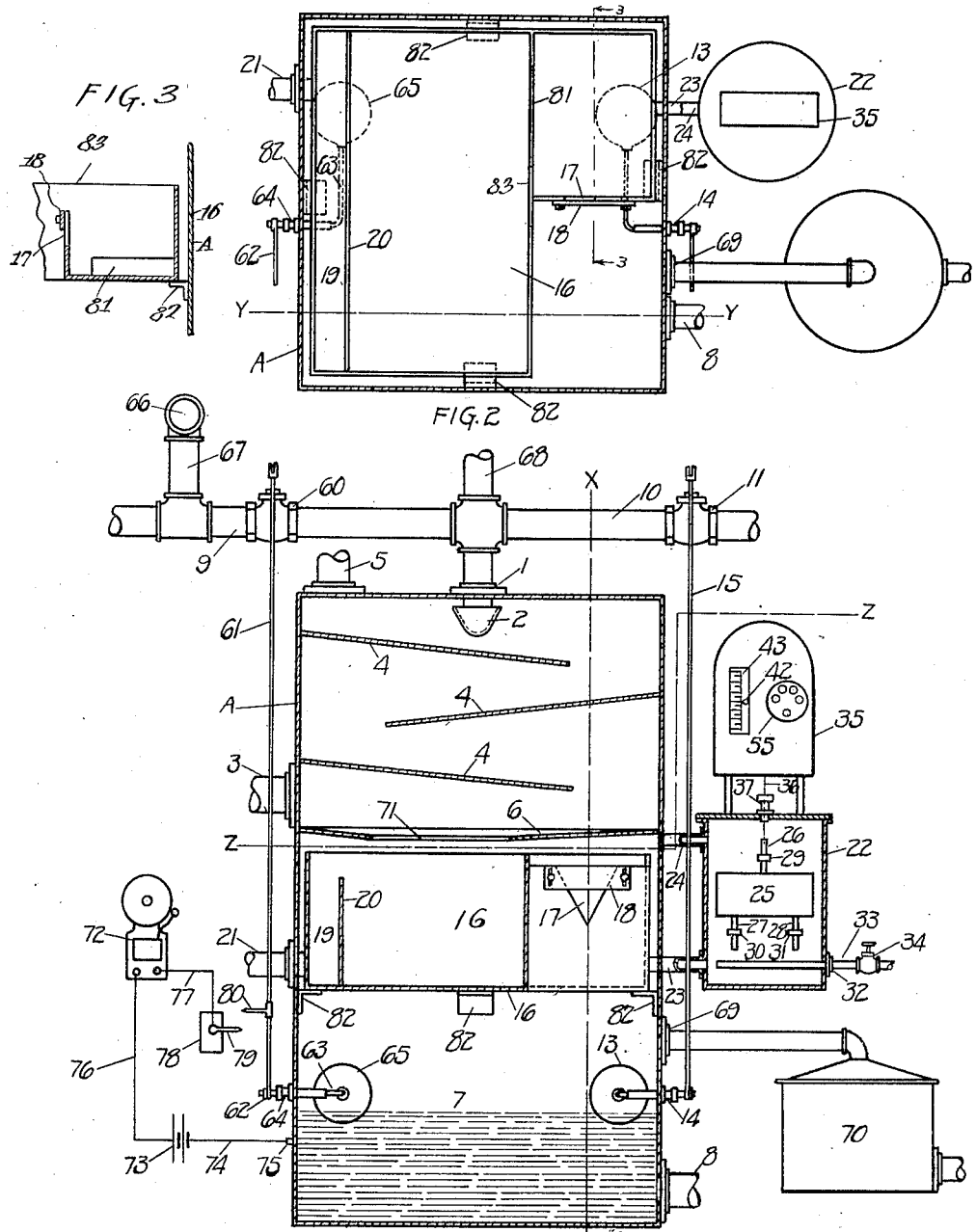

HARLEY C. ALGER, OF CHICAGO HEIGHTS, ILLINOIS.

COMBINATION HEATER AND METER.

1,086,433.  Specification of Letters Patent.  Patented Feb. 10, 1914.

Application filed September 9, 1912. Serial No. 719,436.

*To all whom it may concern:*

Be it known that I, HARLEY C. ALGER, a citizen of the United States, residing at Chicago Heights, in the county of Cook and State of Illinois, have invented a new and useful Combination Heater and Meter, of which the following is a specification.

My invention relates to an improvement in liquid heaters wherein the heater is equipped with a measuring device for the purpose of measuring the heated liquid. The many advantages of such a combination are set forth in United States Letters Patent No. 990028 granted to me April 18, 1911 to which reference may be had so that a description of only the particular features of this invention hereinafter described, will suffice.

The objects of this invention are to provide a combination heater and meter which will heat and measure liquid more efficiently than has heretofore been possible, which will require a minimum of floor space and which will allow efficient operation of the heater as though it were not equipped with means for measuring the liquid.

To these ends therefore, my invention consists of certain novel combinations as will be more fully described and which will be particularly pointed out in the claims.

In the accompanying drawings Figure 1. is a vertical view showing my invention in detail partly in section along the line, Y—Y, of Fig. 2; Fig. 2, is a cross-sectional view on the line, Z—Z, of Fig. 1; while Fig. 3 shows a detail of construction.

Referring to Fig. 1, A, represents a heater of any approved type, that shown consisting of a suitably shaped shell. A suitable inlet connection 1 leads the liquid to be heated preferably to the upper end of the shell into which the liquid is discharged in any convenient manner as through a distributing trough 2. A pipe 3 suitably connected to the shell, conveys steam or other heating medium thereto for the purpose of heating the liquid as it passes through the heater. Suitably arranged trays 4, 4, 4, allow the liquid which is delivered by the distributing trough 2 to trickle back and forth through the heater and the steam or other heating medium passing through the pipe 3 commingles with the liquid to be heated thus raising its temperature while any excess of steam, air or vapor, which may be within the heater passes out through the pipe 5. The liquid thus heated may be received by the tray or partition 6 having a suitable aperture 71 allowing the passage of the heated liquid which would normally pass to a storage chamber 7, below. A suitable outlet connection 8 may lead the heated liquid from the storage chamber 7 to pumps, or to any other point at which it is desired to use the heated liquid. The inlet connection 1 may receive liquid from a number of sources. A pipe 9 may be adapted to deliver a portion of the supply being preferably used to deliver liquid returning from traps or drying apparatus, etc., which may be near at hand and when so used, I provide a suitable valve 60 in the pipe 9, operated through a rod 61, a connecting lever 62 and float rod 63 extending through a suitable stuffing box 64, by the float 65, so that the float 65 rising as the liquid within the storage chamber 7 rises, will close the valve 60 and thus automatically regulate the supply through the pipe 9.

In the pipe 9, on the supply side of the valve 60 I provide an overflow 66 connected to pipe 9 by pipe 67 and of sufficient vertical height above the inlet 1 so that all the liquid supplied by the pipe 9 will pass to the heater and none will be wasted through the overflow 66, when the valve 60 is open. When the valve 60 is closed or partially closed, however, any excess of liquid delivered by the pipe 9 will rise in the connecting pipe 67 and pass out of the overflow 66. A pipe 10 is adapted to deliver additional liquid to the heater through inlet connection 1 when the supply through pipe 9 is insufficient; a regulating valve 11 is provided in the pipe 10, while a float 13 may operate through a suitable stuffing box 14 and connecting rod 15 to open the regulating valve 11, when the float 13 reaches a certain low level in the storage chamber 7. The connections to valves 60 and 11 are preferably adjusted so that valve 60 first opens and then if liquid in the storage chamber 7 still lowers due to insufficient supply the float 13 reaches a low level and opens the valve 11 thus insuring an additional supply. A part of the supply may be allowed to pass continually to the heater through the pipe 68 leading to inlet connection 1 and as liquid delivered through such a pipe might cause the heater to fill with liquid, if no liquid were being taken from the storage chamber 7 through outlet connection 8, I provide an overflow connection 69, near the top of the storage chamber 7, which will allow liquid to pass out thus preventing the heater from being filled with liquid.

One novel feature of my invention consists in providing a suitably shaped weir-box or measuring chamber, 16, having a weir 17 with certain novel constructions therein, above the storage chamber, 7, and preferably above the overflow connection 69, the weir-box, 16, being adapted to receive the heated liquid from the tray, 6, and deliver it through the weir, 17, which measures the heated liquid prior to its delivery to the storage chamber 7.

The shape of the weir-box showing the preferred location of the weir is shown in Fig. 2, although I do not wish to be understood as confining myself to the exact constructions set forth.

The tray 6 may be constructed to deliver the heated liquid to one side of the weir-box or measuring chamber, 16, while a baffle 83 may be interposed between the point at which liquid is received within the weir-box and the weir 17 to insure a quiet water level on the supply side near the weir, the liquid passing through an opening 81 in the baffle 83. The relation of the opening 81 with the baffle 83 is shown more clearly in Fig. 3.

In my preferred construction the weir consists of a notch as shown at 17, although the weir may be of any other desired shape, with a guard 18 adapted to close the upper portion of the notch. The guard may be made adjustable so that it may be secured to the side of the weir-box leaving a notch or weir of the required proportions to deliver the amount of liquid desired. Within the weir-box I provide a compartment, 19, separated from direct communication with the weir-box by the partition 20 the top of which is on a level, slightly above the lower edge of the guard 18 so that liquid normally passes through the weir without spilling over the top of the partition 20. The compartment, 19, may lead through pipe, 21, through any suitably arranged liquid seal to the sewer or have any other waste connection. The guard, 18, should be placed as above described so that the maximum amount of liquid which it is desired to measure may pass through the notch 17 and when being delivered at this rate liquid will not rise in the weir-box, 16, above the partition, 20.

At frequent intervals it is desirable to skim the surface of liquid collected within the heater of any light particles which may be floating on the surface of the liquid or suspended therein and with the construction above described the heater may be flushed by supplying a relatively large amount of liquid through either supply pipe, 9 or 10, and the guard, 18, will hold back any liquid delivered in excess of the amount which the weir 17 is designed to measure thus causing the excess of liquid delivered to pass over the top of the partition, 20 to the compartment 19, from whence it passes to the sewer as above described. By this arrangement I am able to flush the heater and skim off any floating particles without interfering with the measurement of the liquid.

Communicating with the weir-box 16 as shown, particularly in Figs. 1 and 2, I provide a float chamber, 22, having a connection, 23, with the weir-box 16 the connection 23 being located at a level below the weir 17, while the upper part of the float chamber 22 communicates with the space within the heater above the weir-box 16 through any suitable connection 24. The water level within the float chamber, 22, is then the same as the water level at the supply side of the weir 17 within the weir-box, 16. Within the float chamber 22 is positioned a float 25 so as to be actuated by the level of the liquid in the float chamber 22; rods 26, 27 and 28, are secured to the float 25 and are slidingly received in guides 29, 30 and 31, respectively, the two rods 27 and 28 being preferably secured to the float 25 at a distance apart to prevent turning of the float while at the same time allowing free movement of the float in a vertical line as the water level within the float chamber 22 rises or falls.

When some waters are heated, scale or sediment is precipitated which might adhere to the various parts with which it comes in contact and if the float 25 were used with such a heated water, the water would in time precipitate an appreciable amount of scale upon the float 25 thus adding to its weight and altering its position with respect to the water level in the float chamber 22. In order to obviate this difficulty I provide a connection 32, through which leads a pipe 33, which may have a suitable valve 34, to another source of supply of liquid and as the amount of liquid which would pass back and forth through the connection 23 is relatively small by supplying liquid through the pipe 32 from some other source at a relatively small rate, I maintain within float chamber 22 a liquid having properties different from the liquid being measured and can select a liquid which may do away with the disadvantages due to the accumulation of scale upon the float.

It is well known that the heating of boiler feed water in an open heater causes some of the scale forming matter to precipitate within the storage chamber of the heater so that in some cases the water which is delivered from the storage chamber may be free from scale forming elements. In such cases, the pipe 33 may connect to the pipe line to which outlet connection 8 leads, if desired.

For the purpose of recording, indicating, or registering the amount of liquid passing over the weir 17 any suitable mechanism may be used. In Fig. 1, I have shown such a mechanism, adapted to be operated by the level of liquid within the float chamber 22, which indicates and registers the amount of liquid passing over the weir 17 and which may be positioned above the float chamber 22, at 35. A wire or other suitable connection, 36, passes through a suitable stuffing box, 37, connecting with the float rod, 26, and transmits motion to the recording device which may be located above.

As previously mentioned liquid may at times pass out of the overflow connection 69 due to liquid entering through pipe 68 while no liquid is being taken away through outlet connection 8; such a condition may also arise while flushing the heater as previously described. As this liquid has passed through the weir 17, and as the loss of this liquid would interfere with the record as given by the registering mechanism 35, I provide a meter 70 of any approved type connected to the overflow connection 69, for the purpose of measuring the liquid allowed to pass out of overflow connection 69. By subtracting the amount of liquid thus allowed to overflow from the record given by the registering mechanism 35 for the corresponding time, the amount of liquid available to pass out of the outlet connection 8 may be obtained so that in this manner an exact record is obtained of all heated liquid delivered through outlet connection 8.

As a further precaution so that the attendant in charge of the apparatus may be informed if liquid within the storage chamber rises to a level near the overflow connection 69, I provide an alarm to indicate such a condition. The alarm may be of any approved construction, a bell 72, Fig. 1, being shown. The bell 72 is in the circuit with batteries 73, or other source of electrical energy; a wire 74 grounded on the heater shell A at 75 leads to the batteries 73; a wire 76 leads from the batteries to the bell, while a wire 77 leads from the bell to a suitable contact maker comprising a base 78 having a contact arm 79 extending therefrom. A second contact arm 80, which may be actuated by the rod 61, and also grounded by its connection therewith, touches the contact arm 79, when the liquid within the storage chamber 7 reaches the desired level thus completing the electrical circuit and causing the bell 72 to ring. The attendant will then be automatically informed when liquid is about to pass out of the overflow connection 69 and can make sure that the meter 70 is in condition to operate properly.

I do not confine myself to the exact construction set forth.

What I claim as my invention and desire to protect by Letters Patent is:

1. The combination with a liquid heater comprising a shell, means for delivering liquid and heating medium thereto and means for discharging heated liquid therefrom, of a weir-box having a triangular opening in its side for the purpose of measuring the heated liquid passing from the weir-box, said weir-box having an overflow located at a level above the upper edge of said triangular opening, the side of said weir-box extending above the triangular opening to a level above the overflow for the purpose of causing excess of liquid to pass through the overflow.

2. The combination with a liquid heater comprising a shell, means for delivering liquid and heating medium thereto and means for discharging heated liquid therefrom, of a weir-box having a weir for measuring the heated liquid, said weir-box having an overflow in communication therewith and a guard adjustable with respect to the weir for the purpose of retarding the passage of liquid to the weir when the rate of flow of liquid to the weir reaches the desired amount and for causing excess of liquid to pass through the overflow.

3. The combination with a liquid heater comprising a shell, means for delivering liquid and heating medium thereto and means for discharging heated liquid therefrom, of a weir-box having a weir for measuring the heated liquid, said weir-box having an overflow located at a level above said weir and means positioned at the level of the overflow for the purpose of preventing the passage of more liquid to the weir than it is desired to have said weir measure and to cause any excess of liquid to pass through the overflow.

4. The combination with a liquid heater comprising a shell, means for admitting liquid and heating medium thereto and means for discharging heated liquid therefrom, of a weir-box having a measuring element for the purpose of measuring liquid, an overflow in communication with said weir-box and means for preventing the passage of an excess of liquid to the measuring element and for causing said excess of liquid to pass through the overflow.

5. The combination of a liquid heater comprising a shell, means for admitting liquid and heating medium thereto and means for discharging heated liquid therefrom, of a weir-box having a weir for the purpose of measuring liquid, an overflow in communication with the weir-box and means for retarding the passage of liquid through said weir when the rate of flow reaches a pre-determined amount and for causing any excess of liquid to pass through the overflow.

6. The combination with a liquid heater comprising a shell, means for admitting liquid and heating medium thereto and means for discharging heated liquid therefrom, of means for measuring the heated liquid, an overflow communicating with the measuring means and means for preventing the passage of liquid to the measuring means at a rate greater than a pre-determined amount and for causing any excess of liquid to pass through the overflow.

7. A combination heater and meter comprising a shell, means located within the shell for heating the liquid, a storage chamber for heated liquid below the heating means, a weir-box interposed across the shell below the heating means and above the storage chamber, said weir-box being adapted to receive liquid from the heating means, a weir in the side of the weir-box for measuring the heated liquid prior to its delivery to the storage chamber and means for delivering liquid from the storage chamber, said weir-box having an overflow in communication therewith and means for retarding the passage of liquid to the weir when the rate of flow reaches a pre-determined amount and for causing any excess of liquid to pass through the overflow.

8. A combination liquid heater and meter comprising a shell, means for admitting liquid and heating medium thereto, a storage chamber for heated liquid, a weir-box adapted to receive heated liquid, a weir adapted to receive liquid from the weir-box, measure it and deliver it to the storage chamber, an overflow in communication with the weir-box, means for retarding the passage of liquid to the weir when the rate of flow reaches a pre-determined amount and for causing any excess of liquid to pass through the overflow, a float chamber communicating with the weir-box, means for supplying liquid to the float chamber from an outside source and means for delivering liquid from the shell.

9. A combination liquid heater and meter comprising a shell, means for admitting liquid and heating medium thereto, a storage chamber for heated liquid, a weir-box adapted to receive heated liquid, said weir-box being positioned under the heating means, a weir adapted to receive liquid from the weir-box, measure it and deliver it to the storage chamber, an overflow in communication with the weir-box, means for retarding the passage of liquid to the weir when the rate of flow reaches a pre-determined amount and for causing any excess of liquid to pass through the overflow, a float chamber communicating with the weir-box, means for supplying liquid to the float chamber from an outside source and means for delivering liquid from the shell.

HARLEY C. ALGER.

Witnesses:
Q. E. DISCHINGER,
JAMES J. HUNT.

---

Copies of this patent may be obtained for five cents each, by addressing the "Commissioner of Patents, Washington, D. C."